United States Patent [19]
Fournier

[11] Patent Number: 5,760,733
[45] Date of Patent: Jun. 2, 1998

[54] APPARATUS FOR AVOIDING CROSSTALK PROBLEMS WHEN LOCATING A VEHICLE TRAVELLING ALONG MEANS FOR PROPAGATING ELECTROMAGNETIC WAVES

[75] Inventor: Denis Fournier, Chatillon, France

[73] Assignee: GEC Alsthom Transport SA, Paris, France

[21] Appl. No.: 668,701

[22] Filed: Jun. 24, 1996

[30] Foreign Application Priority Data

Jun. 27, 1995 [FR] France ................. 9507723

[51] Int. Cl.$^6$ ................................. G01S 13/42
[52] U.S. Cl. ................. 342/146; 342/22; 342/159
[58] Field of Search ................. 342/146, 22, 159, 342/161, 194, 195; 246/125, 40; 340/825.75

[56] References Cited

U.S. PATENT DOCUMENTS

| | | | |
|---|---|---|---|
| 3,587,100 | 6/1971 | Doremus et al. | 463/6 |
| 3,628,147 | 12/1971 | Makino | 370/315 |
| 3,829,682 | 8/1974 | Geiger | 246/125 |
| 3,854,683 | 12/1974 | Bieder et al. | 246/40 |
| 4,022,408 | 5/1977 | Staples | 246/34 R |
| 4,467,430 | 8/1984 | Even et al. | 364/436 |
| 4,488,238 | 12/1984 | Salmon et al. | 364/483 |
| 4,660,215 | 4/1987 | Horiike et al. | 374/48 |

FOREIGN PATENT DOCUMENTS

| | | |
|---|---|---|
| 0568067A1 | 11/1993 | European Pat. Off. . |
| 0586230A2 | 3/1994 | European Pat. Off. . |
| 3124068A1 | 1/1983 | Germany . |
| WO8703698 | 6/1987 | WIPO . |

*Primary Examiner*—John B. Sotomayor
*Attorney, Agent, or Firm*—Sughrue, Mion, Zinn, Macpeak & Seas, PLLC

[57] ABSTRACT

An apparatus for avoiding crosstalk problems when locating a vehicle travelling along an electromagnetic wave propagation path. The apparatus is particularly directed to rail transport. The apparatus includes a transmitter for transmitting electromagnetic waves suitable for propagation along the propagation path. A reflector is included for reflecting the electromagnetic waves which propagate along the propagation path. The apparatus also includes a receiver, a comparator, and a processor. The apparatus is configured so that the transmitter does not transmit electromagnetic waves along the propagation path at the same time that the receiver receives the reflected electromagnetic waves. Because the transmitted waves are not transmitted on the propagation path at the same time as the reflected waves are received, the receiver receives only reflected waves at a time when there is no crosstalk interference between the transmitted and reflected waves. The vehicle's location is determined by comparing the transmitted and reflected waves.

7 Claims, 6 Drawing Sheets

APPARATUS FOR AVOIDING CROSSTALK PROBLEMS WHEN LOCATING A VEHICLE TRAVELLING ALONG MEANS FOR PROPAGATING ELECTROMAGNETIC WAVES

The present invention relates generally to location apparatus for locating vehicles travelling along means for propagating electromagnetic waves, and it relates more particularly to apparatus for avoiding crosstalk problems when locating a vehicle travelling along means for propagating electromagnetic waves.

BACKGROUND OF THE INVENTION

The Applicants' transmission system is designated by the system name IAGO for "Informatisation et Automatisation par Guide d'Ondes" (waveguide computerization and automation), and it is based on using a radiating waveguide.

This transmission system makes it possible to provide both-way communication continuously and at a high data rate between fixed equipment and moving equipment.

The radiating waveguide is an aluminum transmission medium placed along the track.

The radiating waveguide conveys information from the ground or from the moving equipment at frequencies in the 2.4 GHz to 2.5 GHz band for industrial, scientific, and medical applications.

In addition to transmitting information, the transmission system makes it possible to know the real speed of the moving equipment as well as its absolute position along the track.

The location apparatus for locating a vehicle V travelling along propagation means P for propagating electromagnetic waves includes:

transmit means E for transmitting transmitted electromagnetic waves $\Sigma_e$;

reflection means R' for reflecting said transmitted electromagnetic waves $\Sigma_e$;

receive means R for receiving the reflected electromagnetic waves $\Sigma_r$ reflected by said reflection means R';

comparator means C for comparing said transmitted electromagnetic waves $\Sigma_e$ with said reflected electromagnetic waves $\Sigma_r$; and processing means T for processing the result obtained by said comparator means C, so as to make it possible to determine the distance D between said vehicle V and said reflection means R'.

The propagation means P for propagating said transmitted electromagnetic waves $\Sigma_e$ and said reflected electromagnetic waves $\Sigma_r$ are radiating propagation means.

In a first embodiment, the transmit means E for transmitting the transmitted electromagnetic waves $\Sigma_e$, the receive means R for receiving the reflected electromagnetic waves $\Sigma_r$, the comparator means C, and the processing means T are supported by said vehicle V.

The reflection means R' for reflecting the transmitted electromagnetic waves $\Sigma_e$ are associated with the radiating propagation means P, and are disposed on the ground.

In another embodiment, the transmit means E for transmitting the transmitted electromagnetic waves $\Sigma_e$, the receive means R for receiving the reflected electromagnetic waves $\Sigma_r$, the comparator means C, and the processing means T are associated with the radiating propagation means P, and are disposed on the ground.

The reflection means R' for reflecting the transmitted electromagnetic waves $\Sigma_e$ are supported by the vehicle V.

By way of example, the transmit means E may be radar transmit means;

Both the transmitted electromagnetic waves $\Sigma_e$, and the reflected electromagnetic waves $\Sigma_r$ are radar waves.

Each of the transmitted electromagnetic waves $\Sigma_e$ is composed of a frequency-modulated transmitted carrier wave of constant amplitude, and each of the reflected electromagnetic waves $\Sigma_r$ s composed of a frequency-modulated reflected carrier wave;

The reflection means R' are suitable for transposing the frequency of the transmitted carrier wave composing each of the transmitted electromagnetic waves $\Sigma_e$.

The processing performed by the processing means T on the result obtained by said comparator means C relates to measuring the phase difference between the transmitted carrier wave and the reflected carrier wave.

For reasons of safety, in such apparatus for locating a vehicle, it is necessary to avoid firstly problems of crosstalk between a plurality of reflectors, such problems being encountered when locating one vehicle on a track relative to two reflectors that are close together, and secondly problems of crosstalk between a plurality of vehicles, such problems being encountered when locating two vehicles on the same track and relative to a single reflector.

An IEEE document, Vehicular Technology Society News, May 1994, pages 13 to 28 discloses location apparatus operating by continuously and simultaneously transmitting sequences with low cross-correlation.

Such apparatus for locating a vehicle suffers from the drawbacks of being complex and expensive.

Another drawback of that prior art vehicle location apparatus is that it requires a multitude of terminals to be used, and it requires the terminals to be synchronized.

OBJECTS AND SUMMARY OF THE INVENTION

An object of the invention is to provide apparatus for avoiding crosstalk problems when locating a vehicle travelling along means for propagating electromagnetic waves, which apparatus does not suffer from the drawbacks of prior art apparatus.

The apparatus of the invention for avoiding crosstalk problems when locating a vehicle travelling along means for propagating electromagnetic waves also makes it possible to obtain a high level of accuracy so as to achieve the following objects:

Solving the problems of having to stop or "dock" accurately on platforms equipped with platform-edge safety doors.

Reducing the interval between two trains so as to make it possible to run trains on the "deformable moving section" principle.

The moving section principle is based on the fact that the track is no longer divided up geographically to define a succession of non-deformable fixed sections, but rather it is organized virtually to define a succession of moving sections.

Furthermore, the succession of moving sections is composed of deformable sections because the start and the end of each of the sections have positions that are liable to move.

In other words, the deformable moving section principle is based on the fact that the back of the preceding vehicle becomes the stop point for the following vehicle.

An advantage of such a deformable moving section principle lies in the fact that it makes it possible to reduce the interval between vehicles.

Making it possible to reverse the direction of the vehicles automatically.

Making it possible to initialize stationary vehicles for the purposes of performing operations such as automatic direction-reversal, or automatic side tracking.

According to the invention, the apparatus for avoiding crosstalk problems when locating a vehicle V travelling along propagation means P for propagating electromagnetic waves includes:

transmit means E for transmitting transmitted electromagnetic waves $\Sigma_e$;

reflection means R' for reflecting said transmitted electromagnetic waves $\Sigma_e$;

receive means R for receiving the reflected electromagnetic waves $\Sigma_r$ reflected by said reflection means R';

comparator means C for comparing said transmitted electromagnetic waves $\Sigma_e$ with said reflected electromagnetic waves $\Sigma_r$;

processing means T for processing the result obtained by said comparator means C, so as to make it possible to determine the distance D between said vehicle V and said reflection means R'; and means for alternating transmission and reception of said transmitted electromagnetic waves $\Sigma_e$ and of said reflected electromagnetic waves $\Sigma_r$;

said propagation means P for propagating said transmitted electromagnetic waves $\Sigma_e$ and said reflected electromagnetic waves $\Sigma_r$ being radiating propagation means.

An advantage of the apparatus of the invention for avoiding crosstalk problems when locating a vehicle travelling along means for propagating electromagnetic waves is that it makes it possible for a single vehicle to be located relative to a given set reference point at a given instant without the location being interfered with either by the location systems of the other vehicles or by the other set reference points.

The apparatus of the invention for avoiding crosstalk problems when locating a vehicle V travelling along means P for propagating electromagnetic waves satisfies at least one of the following characteristics:

alternating transmission and reception of the electromagnetic waves is achieved by using sequencer means S which make it possible to synchronize all of the location apparatuses for locating vehicles travelling along means for propagating electromagnetic waves;

said sequencer means S use a data transmission network RT connected to the various vehicle location apparatuses;

said data transmission network RT is supported by said propagation means P;

said sequencer means S convey to the various reflection means R' the instants at which they must be reflective;

said sequencer means S convey to the various transmitters E, the instants at which they must transmit; and said sequencer means S are disposed on the ground.

BRIEF DESCRIPTION OF THE DRAWINGS

Other objects, characteristics, and advantages of the invention appear on reading the following description of the apparatus for avoiding crosstalk problems when locating a vehicle travelling along means for propagating electromagnetic waves, the description being given with reference to the accompanying drawings, in which.

MORE DETAILED DESCRIPTION

Figure 1:
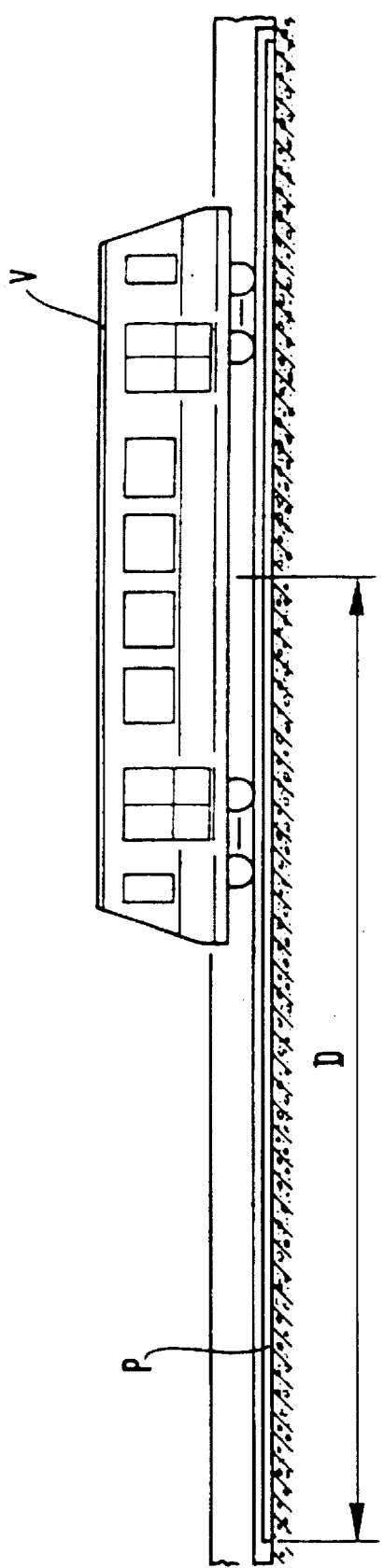
FIG. 1 is an overall diagrammatic view of the Applicants' location apparatus for locating a vehicle travelling along propagation means.

FIG. 1 is an overall diagrammatic view of the Applicants' apparatus for locating a vehicle V travelling along propagation means P.

An object of the Applicants' location apparatus is to determine the position of the vehicle V, i.e. to determine the distance D between the vehicle V and a given point along the propagation means P.

Figure 2:
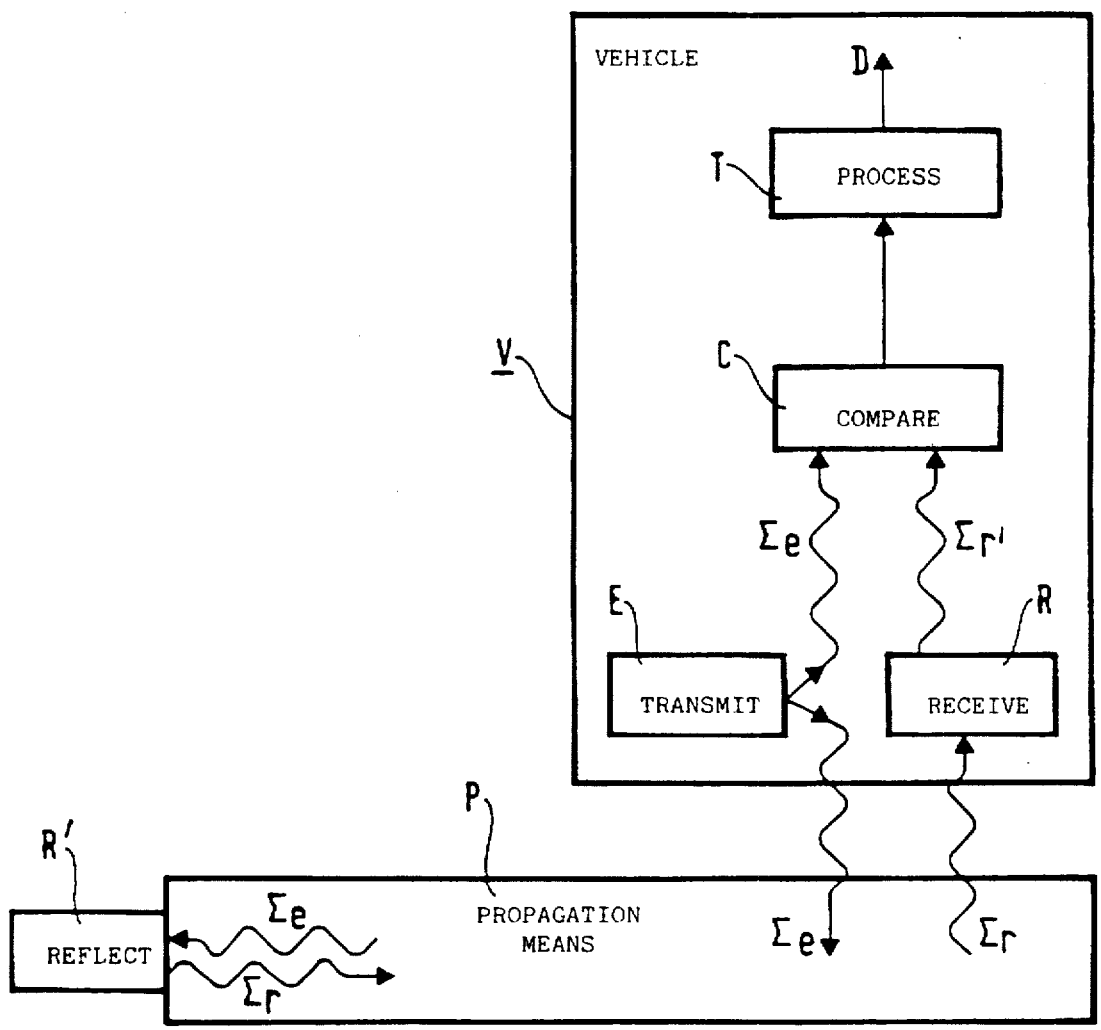
FIG. 2 is a block diagram of a first preferred embodiment of the Applicants' location apparatus for locating a vehicle travelling along propagation means.
Figure 3:
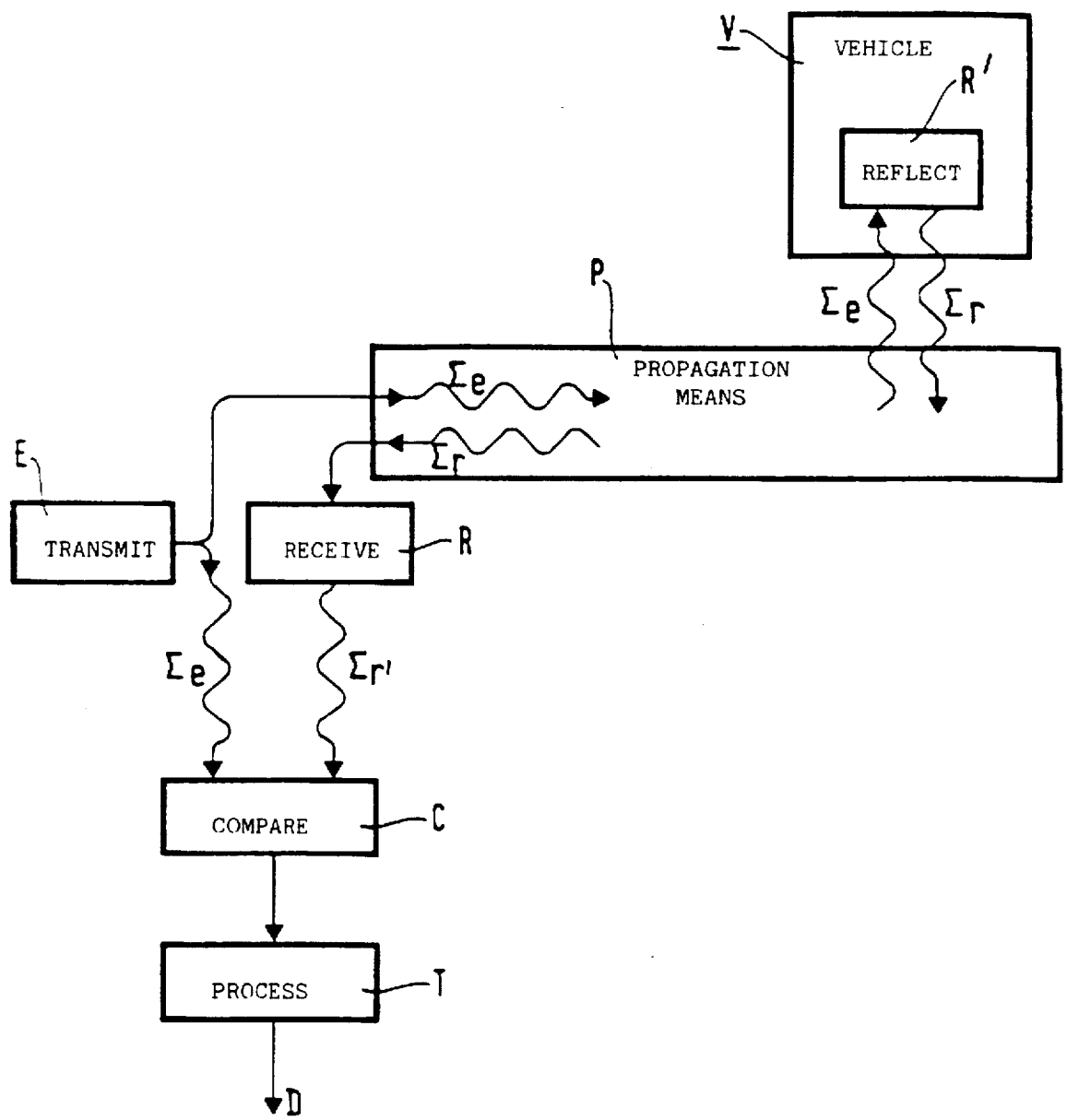
FIG. 3 is a block diagram of another preferred embodiment of the Applicants' location apparatus for locating a vehicle travelling along propagation means.

As shown in the block diagrams in FIGS. 2 and 3, the location apparatus for locating a vehicle V travelling along propagation means P includes transmit means E for transmitting electromagnetic waves $\Sigma_e$ suitable for propagating along the propagation means P, and receive means R.

The location apparatus also includes reflection means R' for reflecting the electromagnetic waves $\Sigma_e$ towards the receive means R.

Comparator means C compare the transmitted electromagnetic waves $\Sigma_e$ with the reflected electromagnetic waves $\Sigma_r$ reflected by the reflection means R'.

The result obtained by the comparator means C makes it possible to calculate the distance D between the vehicle V and the reflection means R', the calculation being performed by processing means T.

The propagation means P for propagating the transmitted electromagnetic waves $\Sigma_e$ and the reflected electromagnetic waves $\Sigma_r$ are radiating propagation means that radiate regardless of the physical location of the transmit means E and of the receive means R along the propagation means P.

FIG. 2 is a block diagram of a first preferred embodiment of the location apparatus for locating a vehicle travelling along propagation means.

In this first embodiment, the location apparatus for locating a vehicle V includes transmit means E for transmitting electromagnetic waves $\Sigma_e$ suitable for propagating along the propagation means P, and receive means R.

Both the transmit means E for transmitting electromagnetic waves $\Sigma_e$, and the receive means R are supported by the vehicle V.

The reflection means R' for reflecting the electromagnetic waves $\Sigma_e$ are associated with the propagation means P so as to reflect the electromagnetic waves $\Sigma_e$ towards the receive means R.

Preferably, both the reflection means R' and the receive means R are heterodyne-type means, i.e. the transmitted waves $\Sigma_e$ are reflected with a frequency change so as to give reflected waves $\Sigma_r$, and the reflected waves $\Sigma_r$ are received with the opposite frequency change so as to give received waves $\Sigma_e$.

The various frequency changes advantageously make it possible for the receive means R to receive selectively. In particular, the waves that come from the waves $\Sigma_e$ transmitted by the transmit means E and that are reflected off the propagation means P instead of being injected into the propagation means P are not taken into account by the receive means R since they are not at the desired frequency.

The reflection means R' are disposed on the ground.

The comparator means C compare the transmitted electromagnetic waves $\Sigma_e$ with the received electromagnetic waves $\Sigma_r$ received by the receive means R.

The result obtained by the comparator means C makes it possible to calculate the distance D between the vehicle V and the reflection means R', the calculation being performed by processing means T.

Both the comparator means C and the processing means T are supported by the vehicle V.

FIG. 3 is a block diagram of another preferred embodiment of the location apparatus for locating a vehicle travelling along propagation means.

In this other embodiment, the location apparatus includes transmit means E for transmitting electromagnetic waves $\Sigma_e$ suitable for propagating along propagation means P, and receive means R.

Both the transmit means E for transmitting electromagnetic waves $\Sigma_e$, and the receive means R are disposed on the ground and are associated with the propagation means P.

Reflection means R' for reflecting the electromagnetic waves $\Sigma_e$ are disposed in the vehicle V so as to reflect the electromagnetic waves $\Sigma_e$ towards the receive means R.

Comparator means C compare the transmitted electromagnetic waves $\Sigma_e$ with the received electromagnetic waves $\Sigma_r$ received by the receive means R.

The result obtained by the comparator means C makes it possible to calculate the distance D between the vehicle V and the receive means R, the calculation being performed by processing means T.

Generally, and regardless of the chosen embodiment, the transmit means E and the receive means R are advantageously and respectively radar transmit means and radar receive means.

As a result, the transmitted electromagnetic waves $\Sigma_e$ are radar waves.

The following description relates to the first embodiment of location apparatus of the invention, including radar transmission means and a radiating waveguide.

The purpose of the following description is to make it possible gain a better understanding of how the location apparatus of the invention may be implemented.

The on-board radar transmission means inject a carrier wave into the waveguide. The carrier wave propagates along the waveguide to the ends thereof.

A transducer installed at one end of the waveguide picks up the transmitted carrier wave. The transducer is of the heterodyne type making it possible to transpose the frequency of the carrier wave. The transducer re-transmits the carrier wave into the waveguide.

The transposed carrier wave propagates along the waveguide towards the vehicle, and it is received by the on-board radar receive means. The on-board radar receive means are receive means of the heterodyne type making it possible to transpose the carrier wave back to its initial frequency. Comparator means compare the transmitted carrier wave with the reflected carrier wave after the reflected carrier wave has been returned to the frequency of the transmitted carrier wave.

For example, the measurement may relate to the phase difference between the transmitted carrier wave and the reflected carrier wave. The phase difference is related to the distance D travelled by the waves.

This operation is preferably performed for a large number of frequencies. Such measurements make it possible to obtain a table of complex numbers (amplitude and phase).

By applying a Fourier transform to the table of complex numbers, it is possible to go from the frequency domain to the time domain.

It is possible to read the impulse response of the system from the table transposed from the frequency domain to the time domain. The propagation time of the waves is determined by observing the position of the peak of the impulse response.

Given the propagation speed of the waves along the waveguide, it is possible to calculate the position of the vehicle.

Another solution consists in working in the time domain, rather than in the frequency domain.

Naturally, the apparatus of the present invention may be used with propagation being through the air and with transponders placed along the track. However, phenomena related to multiple paths being present reduce accuracy.

For example, the propagation means may be constituted either by a radiating waveguide, or by a radiating cable, provided that sufficiently wide frequency bands are available.

Figure 4:
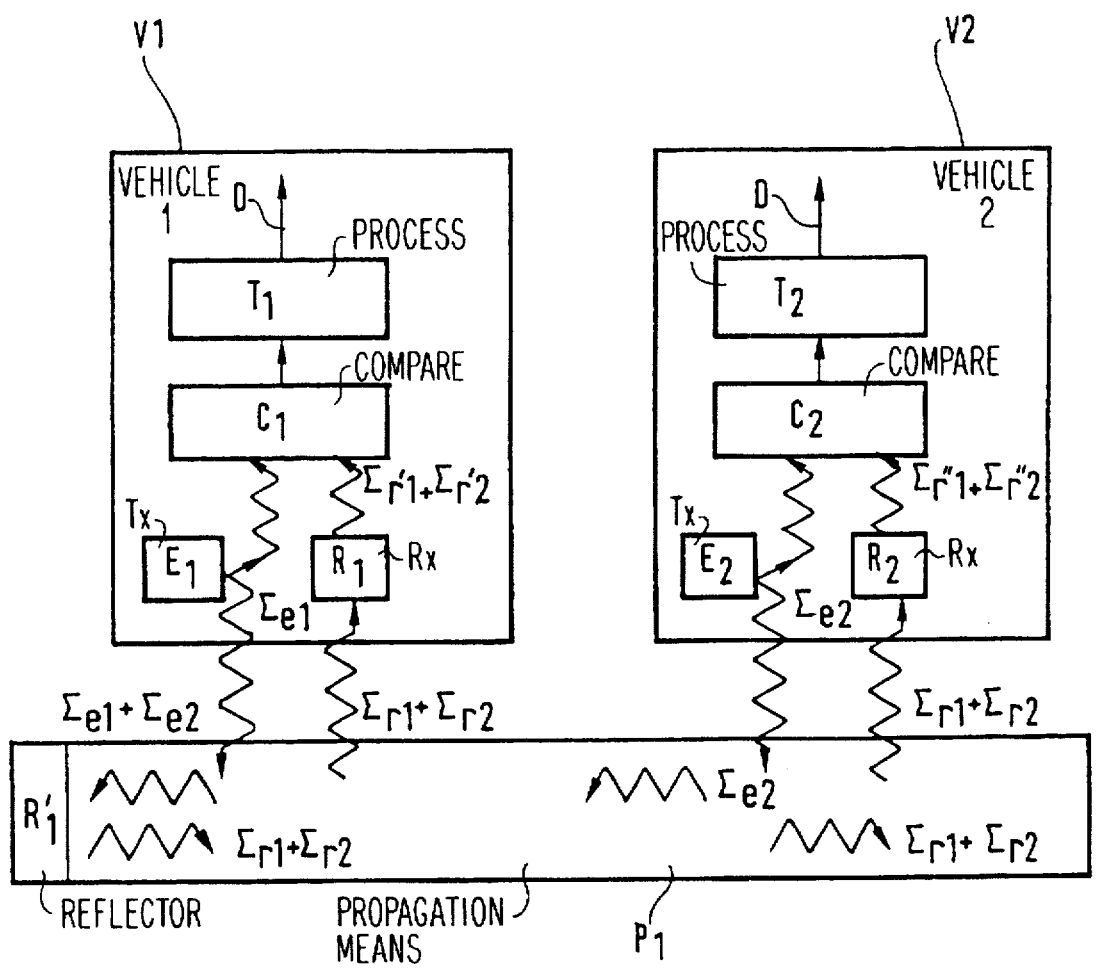
FIG. 4 is a block diagram of the Applicants' location apparatus for locating a vehicle travelling along means for propagating electromagnetic waves, showing crosstalk problems encountered between a plurality of vehicles when locating two vehicles on the same track and relative to a single reflector.

FIG. 4 is a block diagram of the Applicants' apparatus for locating a vehicle travelling along means for propagating electromagnetic waves, showing the crosstalk problems encountered between a plurality of vehicles when locating two vehicles on the same track and relative to a single reflector.

As shown in FIG. 4, the transmitter $E_1$ of the first vehicle $V_1$ transmits electromagnetic waves $\Sigma_{e1}$ into the electromagnetic wave propagation means $P_1$.

The transmitter $E_2$ of the second vehicle $V_2$ transmits electromagnetic waves $\Sigma_{e2}$ into the electromagnetic wave propagation means $P_1$.

The reflection means $R'_1$ disposed at the end of the electromagnetic wave propagation means $P_1$ reflect the transmitted electromagnetic waves $\Sigma_{e1}$ and $\Sigma_{e2}$ resulting in the reflected electromagnetic waves $\Sigma_{r1}$ and $\Sigma_{r2}$.

The receive means $R_1$ and $R_2$ disposed on the vehicles effect frequency changes so as to give the received waves $\Sigma_{r'1}$ and $\Sigma_{r'2}$ on the first vehicle $V_1$, and the received waves $\Sigma_{r''1}$ and $\Sigma_{r''2}$ on the second vehicle $V_2$.

In the zones in which first and second vehicles $V_1$ and $V_2$ are to be located relative to a common reflector $R'_1$, the comparator $C_1$ of the first vehicle $V_1$ does not compare $\Sigma_{e1}$ with $\Sigma_{r'1}$ but rather with $\Sigma_{r'1}+\Sigma_{r'2}$, and the comparator $C_2$ of the second vehicle $V_2$ does not compare $\Sigma_{e2}$ with $\Sigma_{r''2}$ but rather with $\Sigma_{r''1}+\Sigma_{r''2}$.

As a result of the above, crosstalk interferes with locating two vehicles on the same track and relative to a single reflector.

Figure 5:
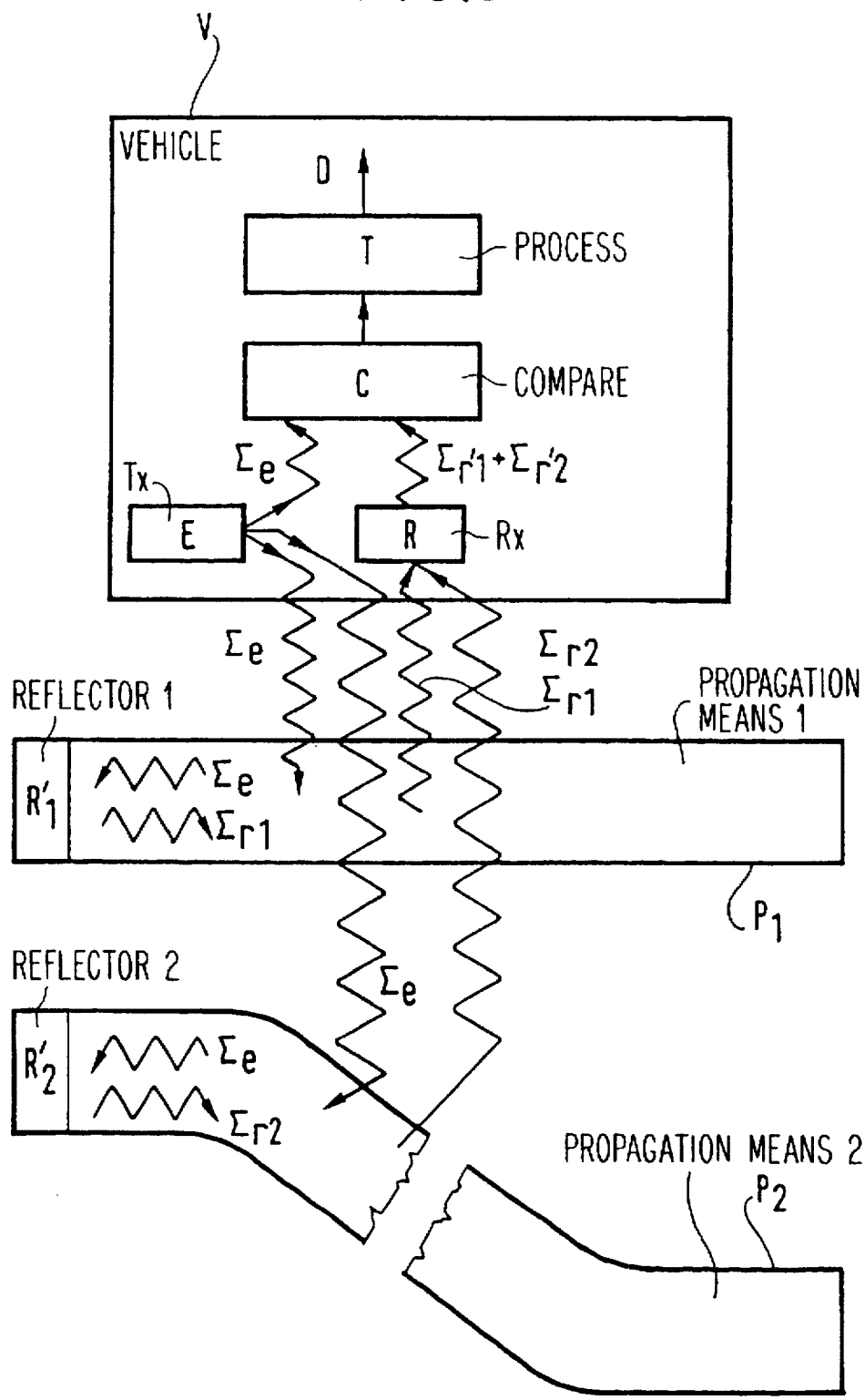
FIG. 5 is a block diagram of the Applicants' location apparatus for locating a vehicle travelling along means for propagating electromagnetic waves, showing crosstalk problems encountered between a plurality of reflectors when locating one vehicle on a track relative to two reflectors that are close together.

FIG. 5 is a block diagram of the Applicants' apparatus for locating a vehicle travelling along means for propagating electromagnetic waves, showing the crosstalk problems encountered between a plurality of reflectors when locating one vehicle on a track relative to two reflectors that are close together.

As shown in FIG. 5, the transmitter E of the vehicle V transmits electromagnetic waves $\Sigma_e$ into the first electromagnetic wave propagation means $P_1$.

The first reflection means $R'_1$ disposed at the end of the first electromagnetic wave propagation means $P_1$ reflect the transmitted electromagnetic waves $\Sigma_e$ resulting in the reflected electromagnetic waves $\Sigma_{r1}$.

Because of the crosstalk problems, the transmitted electromagnetic waves $\Sigma_e$ are coupled into the second electromagnetic wave propagation means $P_2$.

The second reflection means $R'_2$ disposed at the end of the second electromagnetic wave propagation means $P_2$ reflect the transmitted electromagnetic waves $\Sigma_e$ resulting in the reflected electromagnetic waves $\Sigma_{r2}$.

The receive means R disposed on the vehicle V effect a frequency change resulting in the received waves $\Sigma_{r1}$ received by the receive means R of the vehicle V.

Because of the crosstalk problems, the reflected electromagnetic waves $\Sigma_{r2}$ are also received by the receive means R of the vehicle V.

The receive means R disposed on the vehicle V effect a frequency change resulting in the received waves $\Sigma_{r1}$ and $\Sigma_{r2}$ received by the comparator means C of the vehicle V.

In the zones in which the vehicle V is to be located relative to two reflectors $R'_1$ and $R'_2$, the vehicle V does not compare $\Sigma_e$ with $\Sigma_{r1}$ but rather with $\Sigma_{r1}+\Sigma_{r2}$.

As a result of the above, crosstalk interferes with locating one vehicle on a track relative to two reflectors that are close together.

In the zones in which crosstalk can exist either between a plurality of vehicles, or between a plurality of reflectors, apparatus in parallel with the apparatus for locating a vehicle travelling along means for propagating electromagnetic waves makes it possible to avoid such crosstalk problems.

The apparatus for avoiding crosstalk problems when locating a vehicle travelling along means for propagating electromagnetic waves includes means for alternating transmission and reception of the electromagnetic waves.

As a result, in a zone in which crosstalk is possible, either between a plurality of vehicles, or between a plurality of reflectors, the apparatus of the invention for avoiding crosstalk problems allows transmission from no more than one vehicle at a time, and reflection from no more than one reflector at a time.

Figure 6:
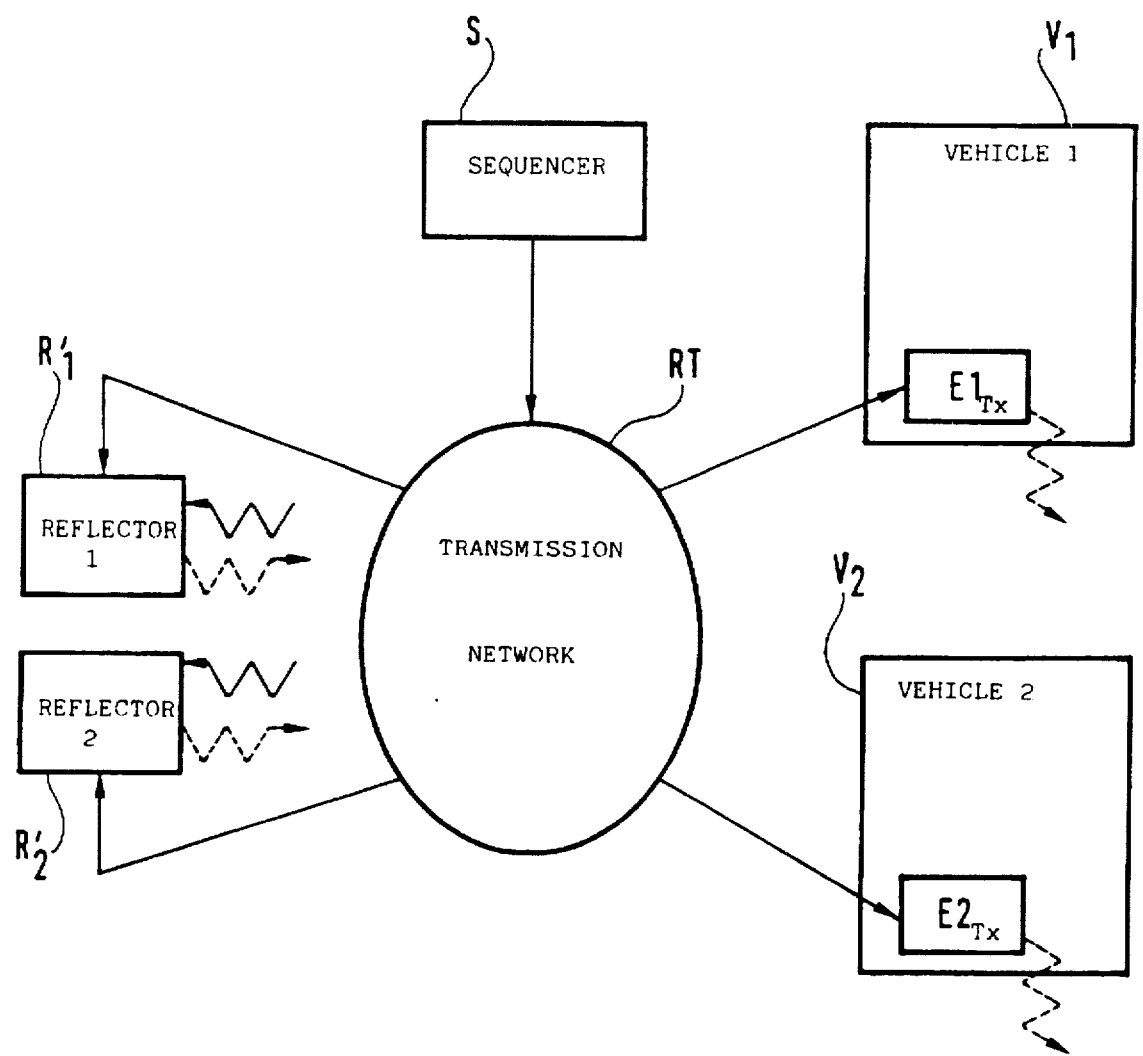
FIG. 6 is a block diagram of a preferred embodiment showing the means for alternating transmission and reception of the electromagnetic waves.

FIG. 6 describes a preferred embodiment of the means for alternating transmission and reception of the electromagnetic waves.

FIG. 6 once again shows the transmitter $E_1$ of the first vehicle $V_1$, the transmitter $E_2$ of the second vehicle $V_2$ and the reflection means $R'_1$, $R'_2$ disposed at the ends of their respective propagation means.

The apparatus of the invention makes it possible to alternate transmission and reception of the electromagnetic waves by using sequencer means S serving to synchronize all of the apparatuses for locating vehicles travelling along means for propagating electromagnetic waves.

For example, the sequencer means may be disposed on the ground.

The sequencer means use a data transmission network RT connected to the various vehicle location apparatuses.

The data transmission network is preferably supported by the transmission medium, namely the radiating waveguide.

The sequencer means convey to the various reflection means R' the instants at which they are to be reflective by means of "reflect" command.

The sequencer means convey to the various transmitters E the instants at which they are to transmit by means of a "transmit" command.

I claim:

1. Apparatus for locating a vehicle travelling along propagation means for propagating electromagnetic waves, said apparatus including:

transmit means $\Sigma$ for transmitting transmitted electromagnetic waves;

reflection means for reflecting said transmitted electromagnetic waves;

receive means for receiving the reflected electromagnetic waves reflected by said reflection means;

comparator means for comparing said transmitted electromagnetic waves with said reflected electromagnetic wave processing means for processing the result obtained by said comparator means, so as to make it possible to determine the distance between said vehicle and said reflection means; and means for alternating transmission and reception of said transmitted electromagnetic waves and of said reflected electromagnetic waves such that said transmission of transmitted electromagnetic waves and said reception of said reflected electromagnetic waves does not occur simultaneously;

said propagation means for propagating said transmitted electromagnetic waves and said reflected electromagnetic waves being radiating propagation means.

2. Apparatus according to claim 1, in which alternating transmission and reception of the electromagnetic waves is achieved by using sequencer means which make it possible to synchronize all of the location apparatuses for locating vehicles travelling along means for propagating electromagnetic waves.

3. Apparatus according to claim 2, in which said sequencer means use a data transmission network connected to the various vehicle location apparatuses.

4. Apparatus according to claim 3, in which said data transmission network RT is supported by said propagation means.

5. Apparatus according to claim 2, in which said sequencer means convey to the various reflection means the instants at which they must be reflective.

6. Apparatus according to claim 2, in which said sequencer means convey to the various transmitters, the instants at which they must transmit.

7. Apparatus according to claim 2, in which said sequencer means are disposed on the ground.

* * * * *